United States Patent
Kim et al.

(10) Patent No.: US 10,056,641 B2
(45) Date of Patent: Aug. 21, 2018

(54) FUEL CELL FOR VEHICLE

(71) Applicants: Hyundai Motor Company, Seoul (KR); Kia Motors Corporation, Seoul (KR)

(72) Inventors: Duck Whan Kim, Seoul (KR); Yong Suk Heo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 292 days.

(21) Appl. No.: 14/458,047

(22) Filed: Aug. 12, 2014

(65) Prior Publication Data
US 2015/0171457 A1 Jun. 18, 2015

(30) Foreign Application Priority Data
Dec. 13, 2013 (KR) .......................... 10-2013-0155748

(51) Int. Cl.
*H01M 8/248* (2016.01)

(52) U.S. Cl.
CPC ........ *H01M 8/248* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| 8,450,027 B2 * | 5/2013 | Kim | H01M 8/247 29/623.1 |
| 2005/0064268 A1 * | 3/2005 | Cho | H01M 8/247 429/470 |
| 2013/0017469 A1 | 1/2013 | Hannesen | |

FOREIGN PATENT DOCUMENTS

| JP | 07211339 A | * | 8/1995 |
| JP | 2008-537308 A | | 9/2008 |
| KR | 10-0551809 B1 | | 2/2006 |
| KR | 10-2009-0041798 A | | 4/2009 |
| KR | 10-2009-0090730 A | | 8/2009 |
| KR | 10-2009-0109971 A | | 10/2009 |
| KR | 10-2011-0057848 A | | 6/2011 |

* cited by examiner

*Primary Examiner* — Tracy Dove
(74) *Attorney, Agent, or Firm* — McDermott Will & Emery LLP

(57) ABSTRACT

A fuel cell for a vehicle includes seats disposed on a side of a separation plate and having a recessed bottom and inclined sides connecting the edges of the bottom and the separation plate at an angle. Gaskets are projected along the seats on the side of the separation plate. Fastening bars are seated in the seats with the gaskets projected thereon, in the shape of a strip fastening the fuel cell and have a body being in close contact with the bottom and flanges being in close contact with an inclined side.

5 Claims, 3 Drawing Sheets

Prior art

US 10,056,641 B2

FUEL CELL FOR VEHICLE

CROSS-REFERENCE TO RELATED APPLICATION

The present application claims the benefit of priority to Korean Patent Application Number 10-2013-0155748 filed on Dec. 13, 2013, the entire contents of which application is incorporated herein for all purposes by this reference.

TECHNICAL FIELD

The present disclosure relates to a fuel cell for a vehicle, a fastening structure capable of increasing structural stability during a vehicle collision.

BACKGROUND

Fuel cell stacks are composed of a plurality of cells between end plates at both ends, in which each of the cells is composed of a membrane electrode assembly (MEA), a gas diffusion layer (GDL), and a separation plate. Hydrogen, air, and cooling water are supplied through a channel inside the separation plate and a gasket is used to seal fluid between separation plate. Since the cells in the stacks are directly associated with ohmic loss due to an increase in contact resistance and mass transfer resistance in the GDL, it is necessary to maintain an appropriate fastening force in order to achieve high performance.

The stacks that are mounted on a vehicle require high performance, so that the plurality (one hundred to three hundreds or more) of cells with around 1V are generally stacked. The stacked unit cells are pressed by the end plates and fastened vertically by one or more fastening bars. In the conventional fastening structure, fastening bars are parallel to and in contact with one side of the stacks without any locking structure. Accordingly, the fuel cell stacks may be deformed or the separation plate may be separated from a fuel cell stack during a vehicle front/rear collision. This is likely to cause problems such as a secondary electric accident or leakage of the hydrogen. Therefore, a structure for stably fastening the fuel cell stack is necessary to structural stabilization.

The description provided above as a related art of the present disclosure is just for helping in understanding the background of the present disclosure and should not be construed as being included in the related art known by those skilled in the art.

SUMMARY OF THE DISCLOSURE

The present disclosure provides a fuel cell for a vehicle having a fastening structure capable of increasing structural stability during a vehicle collision.

According to an exemplary embodiment of the present disclosure, a fuel cell for a vehicle comprises a groove formed on one side of a separation plate, The groove has a recessed bottom and an inclined side which is connected to each end of the recessed bottom at an angle. A gasket covers the groove along the one side of the separation plate. A fastening bar is seated on the groove with the gasket covering thereon, in the shape of a strip fastening the fuel cell. The fastening bar has a body being in close contact with the recessed bottom and has flanges being in close contact with the inclined side. Both ends of the fastening bar are bent upwardly while the fastening bar is attached to a middle plate that is disposed between the body of fastening bar and the gasket.

The gasket may cover the one side of the separation plate such that a side of the gasket extends along the side of the separation plate while covering.

The body of the fastening bars may have a length corresponding to a total length of the recessed bottom.

Each of the flanges of the fastening bar may have a length corresponding to a length of the inclined side.

An angle between the body and the flanges of the fastening bars may be larger than an angle between the recessed bottom and the inclined side of the groove.

When the gaskets cannot fully cover an outer side of the separation plate, an insulator having the same shape as the fastening bar may be inserted in between the fastening bars and the separation plate.

According to the fuel cell for a vehicle having the structure described above, it is possible to achieve a fastening structure concept that is structurally safe even in a collision by matching a fastening bar and the module shape (separation plate shape).

Further, it is possible to improve safety against front/rear collisions by holding the inclined sides of the groove on the separation plate and to increase rigidity of the stack module by improving rigidity of the fastening bar itself.

BRIEF DESCRIPTION OF THE DRAWINGS

The above and other features of the present disclosure will now be described in detail with reference to certain exemplary embodiments thereof illustrating by the accompanying drawings which are given herein below by way of illustration only, and thus are not limitative of the present disclosure.

Figure 1:
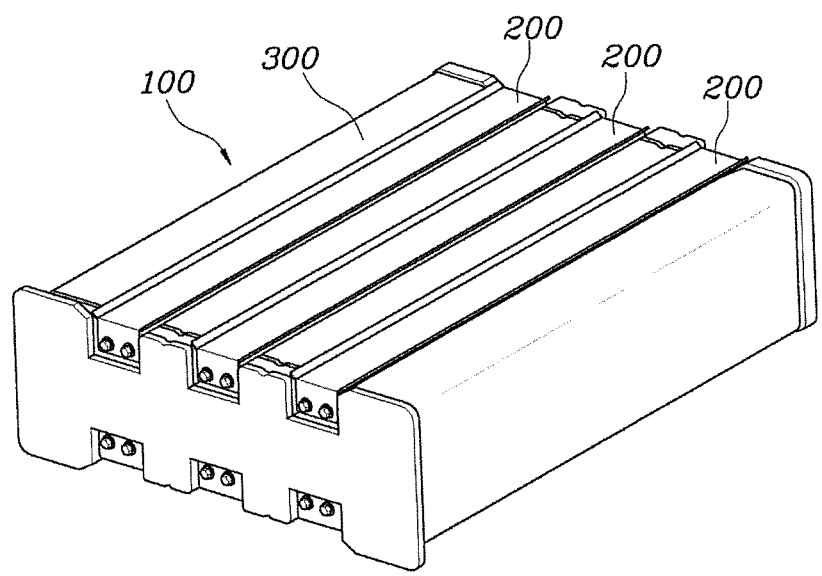
FIG. 1 is a perspective view of a fuel cell for a vehicle according to an embodiment of the present disclosure.

It should be understood that the appended drawings are not necessarily to scale, presenting a somewhat simplified representation of various preferred features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Embodiments of the present disclosure are described hereafter with reference to the accompanying drawings.

Figure 2:
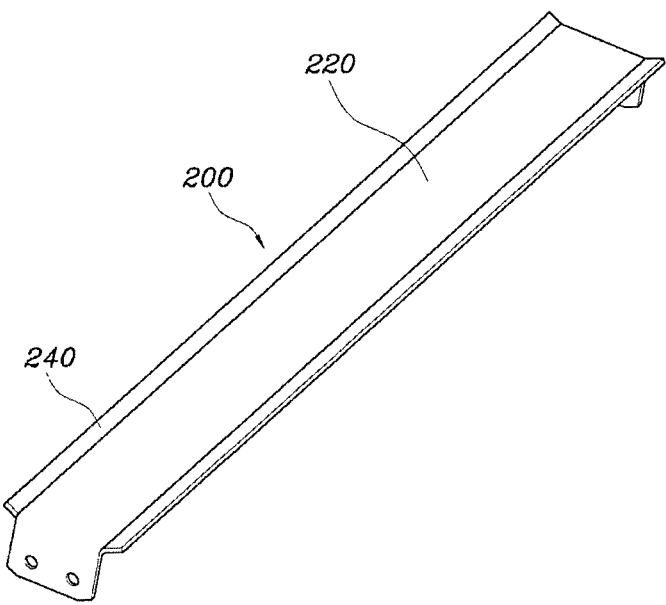
FIG. 2 is a view showing a fastening bar of a fuel cell for a vehicle according to an embodiment of the present disclosure.

FIG. 1 is a perspective view of a fuel cell for a vehicle according to an embodiment of the present disclosure. FIG. 2 is a view showing a fastening bar of a fuel cell for a vehicle according to an embodiment of the present disclosure. FIG.

Figure 4:
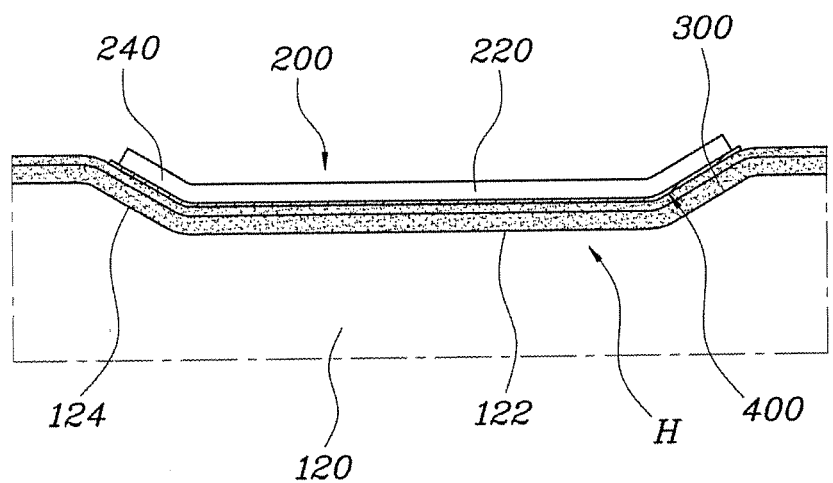
FIG. 4 is a view showing the state when a fuel cell for a vehicle is fastened according to another embodiment of the present disclosure.

3 is a view showing the state when a fuel cell for a vehicle is fastened according to an embodiment of the present disclosure. FIG. 4 is a view showing the state when a fuel cell for a vehicle is fastened according to another embodiment of the present disclosure.

As shown in FIGS. 1-4, a fuel cell 100 for a vehicle according to the present disclosure includes a groove H formed on one side of a separation plate 120. The groove H has a recessed bottom 122 and an inclined side 124 which is connected to each end of the recessed bottom 122 at an angle. A gasket 300 covers the groove H on the side of the separation plate 120. A fastening bar 200 is seated on the grooves H with the gasket 300 covering thereon, in the shape of a strip fastening the fuel cell 100, and having a body 220 being in close contact with the bottom 122 and flanges 240 being in close contact with the inclined side 124.

Figure 5:
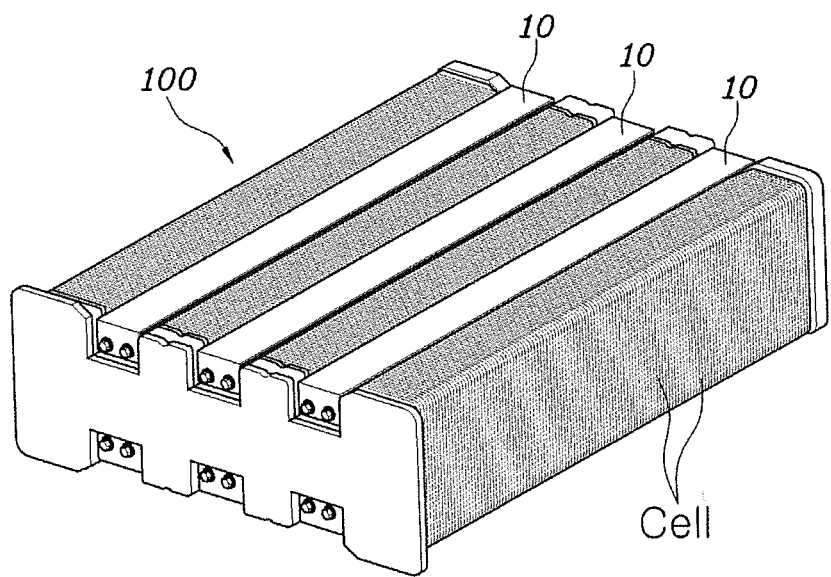
FIG. 5 is a view of a fuel cell for a vehicle according to the related art.

The member indicated by the reference number 10 in FIG. 5 is a common bar type of fastening bar 10 and is different from the fastening bar 200 of the present disclosure in that it does not have the flanges 240.

In the present disclosure, the groove H is formed on one side of the separation plate 120. The groove H has the recessed bottom 122 and the inclined side 124 which is connected to each end of the recessed bottom 122. The shape of the groove H is shown in detail in FIG. 3.

That is, the groove H is formed on the one side of the separation plate 120, which is a flat panel, and the fuel cell is fastened through a plurality of grooves, such that force that combines the fuel cell can be stably maintained.

In particular, since the groove H has the bottom 122 that is a recessed straight part and the edges of the bottom 122 and the separation plate are connected by the inclined sides 124, manufacturing is easy, and the gasket 300 can be kept in close contact with the groove H.

The gasket 300 covering on the separation plate 120 covers along the groove H on the side of the separation plate 120. The gasket 300 covers for airtightness along an edge of the side of the separation plate 120. Further, the gasket 300 may further extend along the one side of the separation plate 120 while covering the groove H. Alternatively, the gasket 300 may be applied to an outer side of the separation plate 120 for individual fastening, or when the gasket cannot fully cover the groove, a separate insulator 400 may be inserted, as in FIG. 4. The insulator 400 has the same shape as the fastening bar 200 and is longer than the flanges 240 of the fastening bar 200.

The fastening bar 200 is seated on the groove H with the gasket 300 covering thereon, in the shape of a strip fastening the fuel cell 100, and has the body 220 being in close contact with the bottom 122 and the flanges 240 being in close contact with the inclined sides 124.

Figure 3:
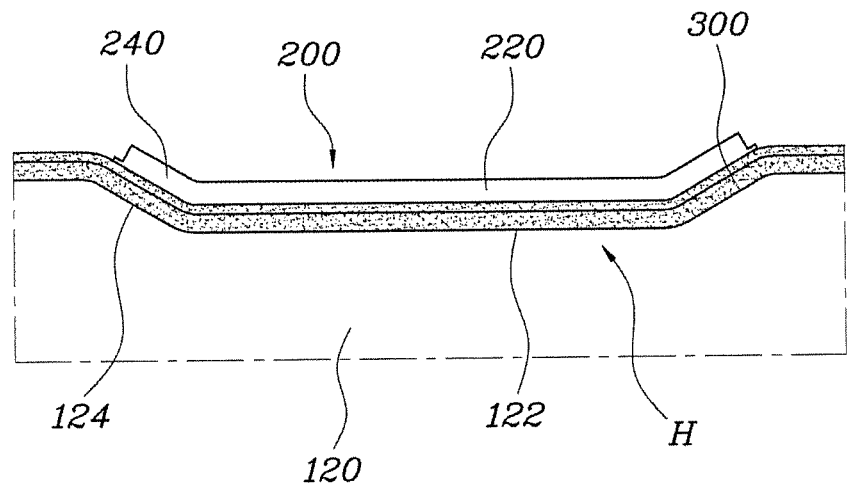
FIG. 3 is a view showing the state when a fuel cell for a vehicle is fastened according to an embodiment of the present disclosure.

As shown in FIGS. 2 and 3, the fastening bar 200 has the body 220 formed in a straight bar shape and the flanges 240 bending outward at the sides of the body. The body 220 of the fastening bar 200 may have a length corresponding to the bottom 122 of the groove H. The flanges 240 of the fastening bar 200 may have a length corresponding to the inclined sides 124 of the groove H.

Further, an angle between the body 220 and the flange 240 of the fastening bar 200 may be larger than an angle between the bottom 122 and the inclined sides 124 of the groove H. According to this configuration, the fastening bar 200 is slightly compressed and elastically deformed in close contact with the groove H. Particularly, because of a difference of the angles, the fastening bar 200 can be compressed and fastened while pressing the groove H and the separation plate 120. Further, it applies a force to the gasket 300.

On the other hand, when the gasket cannot fully cover the outer side of the separation plate, an insulator having the same shape as the fastening bar may be inserted in between the fastening bar and the separation plate.

According to the fuel cell for a vehicle having the structure described above, it is possible to achieve a fastening structure concept that is structurally safe even in a collision by matching a fastening bar and the module shape (separation plate shape).

Further, it is possible to improve safety against front/rear collisions by holding the inclined sides of the groove on the separation plate and to increase the rigidity of the stack module by improving the rigidity of the fastening bar itself.

Although the present disclosure was described with reference to specific embodiments shown in the drawings, it is apparent to those skilled in the art that the present disclosure may be changed and modified in various ways without departing from the scope of the present disclosure, which is described in the following claim.

What is claimed is:

1. A fuel cell for a vehicle, comprising:
   a groove formed on one side of a separation plate, the groove having a recessed bottom and inclined sides which are connected to ends of the recessed bottom, respectively, at an angle;
   a gasket covering the groove along the one side of the separation plate; and
   a fastening bar disposed on an upper portion of the gasket while the gasket is disposed on an upper portion of the groove to cover the groove, the fastening bar having a strip shape and including:
      a body, which is in close contact with the gasket covering the recessed bottom; and
      flanges, which are end portions of the body and which extend upwardly, being in close contact with the gasket that covers the inclined sides at ends of the body, respectively,
   wherein the end portions extend from the ends of the body in a longitudinal direction of the fastening bar.

2. The fuel cell of claim 1, wherein the gasket covers and extends along the one side of the separation plate while covering the groove.

3. The fuel cell of claim 1, wherein the body of the fastening bar has a length corresponding to a length of the recessed bottom of the groove.

4. The fuel cell of claim 1, wherein the flanges of the fastening bar each have a length corresponding to a length of each of the inclined sides of the groove, respectively.

5. The fuel cell of claim 1, wherein an angle between the body and the flange of the fastening bar is larger than the angle between the end of the recessed bottom and the inclined sides of the groove, respectively.

* * * * *